United States Patent
Yunus

(10) Patent No.: US 6,907,151 B2
(45) Date of Patent: Jun. 14, 2005

(54) OPTICAL COUPLING FOR A FLIP CHIP OPTOELECTRONIC ASSEMBLY

(75) Inventor: Mohammad Yunus, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 433 days.

(21) Appl. No.: 10/253,087

(22) Filed: Sep. 24, 2002

(65) Prior Publication Data

US 2004/0057648 A1 Mar. 25, 2004

(51) Int. Cl.$^7$ ................................................. G02B 6/12

(52) U.S. Cl. ........................................... 385/14; 385/31

(58) Field of Search ............................... 385/14, 31–33, 385/47–49, 15

(56) References Cited

U.S. PATENT DOCUMENTS 6,330,377 B1 * 12/2001 Kosemura .................... 385/14

* cited by examiner

Primary Examiner—Frank G. Font
Assistant Examiner—Michael P. Mooney
(74) Attorney, Agent, or Firm—Yingsheng Tung; Wade James Brady, III; Frederick J. Telecky, Jr.

(57) ABSTRACT

A flip chip optoelectronic device assembly includes a hollow, cylindrical spacer between an optical source in the substrate and the active surface of the chip, which precludes attenuation of the signal and allows direct transmission through air. An underfill material fills the space between chip and substrate, thereby allowing substrates which are not necessarily matched in thermal expansion to the chips, and the spacer acts as a dam to prevent ingress of underfill material into the optical path. The spacer not only allows use of conventional underfill materials to support the interconnection joints and thermal mismatch, but also defines a fixed "z" axis distance between substrate and chip.

17 Claims, 3 Drawing Sheets

OPTICAL COUPLING FOR A FLIP CHIP OPTOELECTRONIC ASSEMBLY

FIELD OF THE INVENTION

This invention relates generally to hybrid optoelectronic devices, and more particularly to optical connections for assembly of such devices.

BACKGROUND OF THE INVENTION

In communications and computer related fields, a need exists for combining electrical and optical technologies. In particular, deregulation of telecommunication operations has resulted in widespread use of Internet, e-mail, data transmission, cable networks and wireless telephones. These developments have driven a strong demand for increased network capacity, speed, and bandwidth, and to meet this demand, telecommunications services have been installing optical networks because they anticipate greater capacity, and more cost effective features than traditional hard wired networks. Current research anticipates even wider use of high speed optoelectronics in which photons, rather than electrons will pass signals from board to board, or chip to chip thereby avoiding the delays of conventional wiring. Electrical signals from a processor will modulate a light or laser beam which would shine through air, a waveguide, or an optical fiber to a photodetector, which in turn will pass signals on to the electronics.

The resulting demand for optical and optoelectronic components, and the associated packaging technology to meet the unique needs of these applications far exceeds current capabilities. Broadband performance, high density interconnection, and precise alignment of the optical components present significant challenges to existing assembly technology. The cost of producing optical and optoelectronic modules is dominated by the cost of optical interconnections and packaging the devices, rather than the cost of the components. Ultimately, the cost of packaging and assembly of optoelectronic devices will need to be comparable to that for electronic components, and must rely on much of the technology and automation from the existing industry.

Currently, the manufacture of optoelectronics modules requires that an optical fiber be properly aligned to an optoelectronic chip, namely an integrated circuit. Optical signals received or transmitted over optical fibers are coupled to an optoelectronic chip where they are converted to electrical signals. Optical signal coupling is optimized by precise alignment with minimum attenuation.

A hybrid optoelectronic package is formed by interfacing an optical fiber with an optoelectronic device, but preferably direct contact is not made between the chip surface and fiber end in order to avoid damage to the chip surface.

A significant aspect of packaging optoelectronic devices or modules involves aligning an active circuit to an optical fiber or waveguide, and electrically and mechanically bonding the circuit to a substrate having interconnection circuitry. One bonding approach which has been used in electronic components, and which is gaining favor in optoelectronic devices is flip chip connection by solder bonding. Flip chip bonding allows for direct connection of the active surface of a semiconductor device to a substrate. The contact pads on each chip include solder bumps which are mated to pads on the substrate, and the solder is reflowed to ensure electrical and physical contact. Surface tension in the molten solder causes the opposing contact pads to be aligned with good precision.

Prior art assembly of optoelectronic devices included one or more optical fibers positioned on a substrate having wiring interconnections, and the circuit chip(s) bonded to the substrate through wire bonds or flip chip interconnection. Some early work on flip chip assembly of optoelectronic devices provided a silicon substrate having a groove anisotropic ally etched, the fiber aligned in the groove, a film deposited to cover and secure the fiber, and conventional solder mount of a flip chip to the substrate. Despite the advantage of similar thermal expansion between the substrate and chip, high cost, misalignment, and some reliability issues have precluded the success of this process.

It has long been recognized that in order to gain the desired high frequency response for optoelectronic devices, minimizing the interconnection distance provides the best approach, and that flip chip assembly, wherein the active circuit of the chip is aligned directly atop the end of the fiber, offers the best solution for these high speed devices.

However, the use of flip chip bonding for optoelectronic assembly has revealed limitations which were not of concern in electronics, namely bonding optical and optoelectronic devices involves even more demanding alignment tolerances than electronics. Alignment in the plane normal to the substrate ("z" direction) typically has not been of concern in electronics, but in optoelectronics alignment in each of the "x", "y", and "z" directions is critical to optical coupling efficiency.

One form of prior art optoelectronics packaging, illustrated in FIG. 1a included an aperture 101 formed through a substrate 100, and an optical fiber 120 secured within the opening. The substrate with fiber could be aligned in the "x" and "y" directions, but improper alignment in the "z" direction could allow the fiber to touch the active surface of an optoelectronic chip 110 and damage the device. Alternately, in FIG. 1b the end of the optical fiber 121 positioned through the aperture 101 was much further from the active surface of the chip 111, and could result in misalignment in the "z" direction, and signal loss.

More recently, attempts have been made to position optical fibers or waveguides in different types of substrates, and to flip chip mount the active components onto non-CTE (coefficient of thermal expansion) matching substrates. This requires use of an underfill polymer to control stress on the solder joints resulting from the mismatch. FIG. 2 illustrates the fiber 220 positioned in the substrate 200 and the optoelectronics chip 210 mounted using flip chip solder bumps 240. An underfill material 250 having a costly light transmitting filler surrounds the solder bumps. The assembly is not unlike that used for flip chip semiconductor devices, except that attenuation of light is of utmost importance in optoelectronic device, and therefore, only highly specialized filler for optical transmission may be formulated into the underfill polymer. While the specially formulated underfill material attempts to minimize attenuation of the light beam, it is not as effective as is required for high speed transmission devices.

Not only is the underfill material very expensive, but a slow curing process at a low temperature must be used in order to avoid misalignment of the filler particles and resulting diffraction of the light. The materials are costly, and the process is both time consuming and labor intensive, and thus is not amenable to high volume production.

It would be very beneficial to this fast growing industry if a reliable, cost effective technique for assembling a flip chip optoelectronic device were provided.

SUMMARY OF THE INVENTION

It is an object of the invention to provide a method for flip chip assembly of hybrid optoelectronic devices wherein attenuation of the optical signal is minimized.

It is an object of the invention to provide a reliable flip chip assembly process for optoelectronic devices wherein the coefficient of thermal expansion of the substrate is not necessarily matched to that of the chip.

It is an object of the invention to control alignment of an optical fiber or waveguide to an active circuit on a chip in "x", "y" and "z" directions.

It is an object of the invention to make use of conventional semiconductor flip chip materials and processes for optoelectronic assembly.

It is an object of the invention to provide a process for assembly of flip chip optoelectronic devices which is cost effective, and further is amenable to high volume production.

It is an object of the invention to provide a flip chip process for assembly of devices having optoelectronic components either as a single chip device, or as a multichip module.

It is an object of the invention to eliminate the use of expensive underfill materials having filler particles which transmit the light.

These objectives and other are achieved by providing an assembly including a hollow, cylindrical spacer(s) between the substrate and chip(s) through which the optical signal from an optical fiber or other source is transmitted undisturbed, the chip(s) and substrate are interconnected by solder reflow, and a conventional underfill polymer surrounds the solder joints and area under the chip, except the area where the spacer acts as a dam against polymer ingress. The spacer not only allows use of conventional underfill materials to support the interconnection joints and thermal mismatch, but also defines a fixed "z" axis distance between substrate and chip.

DETAILED DESCRIPTION OF THE DRAWINGS

Figure 1A:
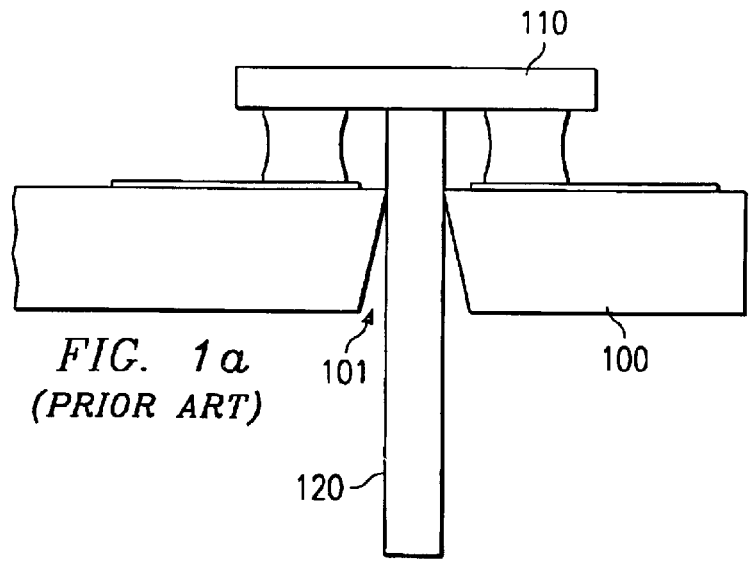
FIG. 1a illustrates an optical fiber extending through a substrate and contacting the chip surface. (Prior art)
Figure 1B:
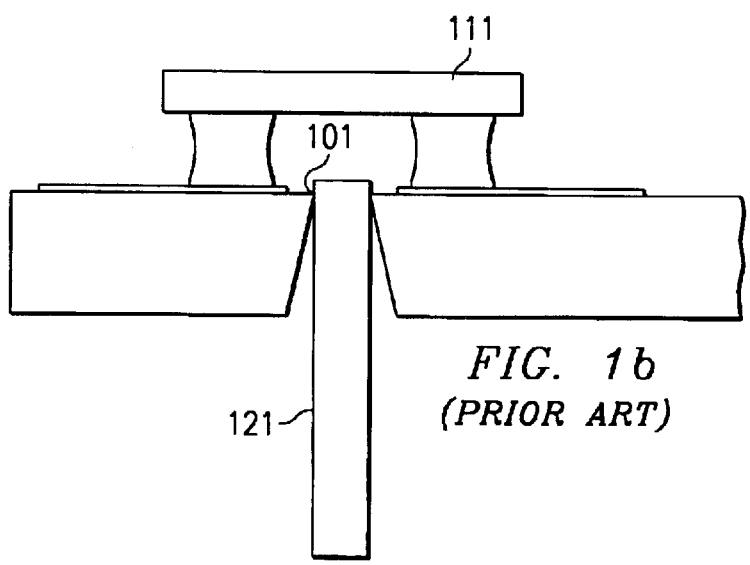
FIG. 1b illustrates an optical fiber extending to the surface of a substrate without "z" alignment control. (Prior art)
Figure 2:
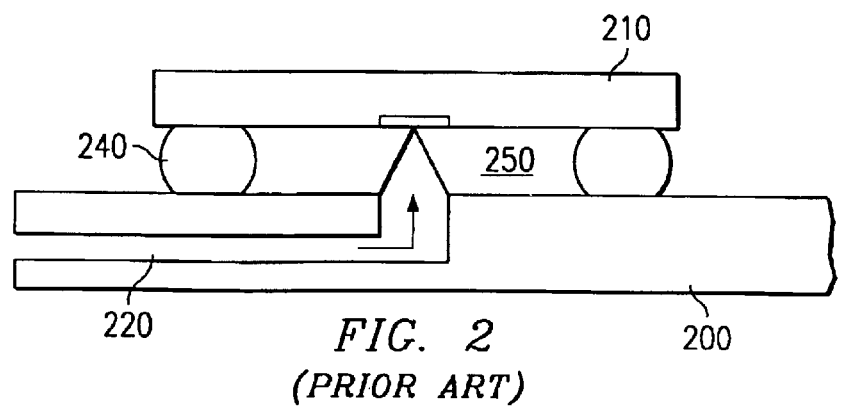
FIG. 2 is a flip chip optoelectronics device having an underfill material formulated with specific light transmitting fillers. (Prior art)

FIGS. 1a, 1b and 2 have illustrated some prior methods for coupling a substrate held optical fiber to an optoelectronic chip, and associated failure mechanisms, such as "z" axis alignment control in FIG. 1, and attenuation of the signal by an underfill material in FIG. 2.

Figure 3:
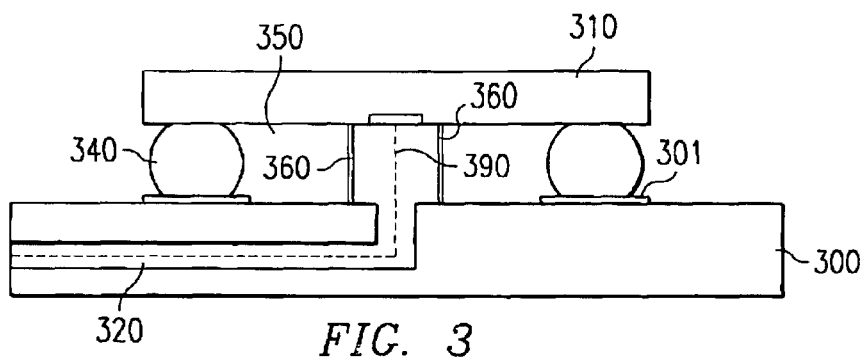
FIG. 3 is a flip chip optoelectronic device of the invention having a spacer which precludes ingress of underfill into the light path.

FIG. 3 illustrates a device of the current invention including coupling between an optical fiber 320 held in a substrate 300 and an optoelectronic chip 310. Electrical connection between the chip 310 contact pads and wiring paths 301 on the substrate are made by solder bumps 340. An underfill material 350 surrounds each bump and most of the space between the chip and substrate. A thin walled cylindrical spacer 360, hollow in the longitudinal direction serves as a dam to prevent the underfill material from encroaching into the optical path 390, and allows the light to be transmitted with little or no attenuation.

The spacer 360 further serves as a stand-off between the chip 310 and substrate 300, thereby accurately controlling the distance and the "z" axis alignment. Solder connected flip chip devices lacking a stand-off are subject to height variation resulting from the weight of the chip, number of contacts, and/or solder reflow conditions.

An optical fiber 320 positioned in the substrate 300 is aligned to an active circuit on the optoelectronic device in the "x" and "y" directions by self aligning solder connections 340, and the "z" axis by the fixed height of the spacer 360. The spacer allows the light beam or other optical signal to be unimpeded by underfill 350 or other foreign substance.

The underfill material 350 surrounds the solder connections 340 and fills the space between chip 310 and substrate 300, except where it is blocked from the optical path by the spacer 360 which acts as a dam to prevent ingress of the polymer. An underfill material 350 serves to mitigate stresses on the solder joints arising from mismatches in thermal expansion between the chip and substrate, and minimizes movement between the components which could result in misalignment. The underfill material 350 of the current invention requires no special optical transmission characteristics, and is a low cost, conventional filled epoxy typical of those used in fabrication of semiconductor flip chip devices. Composition of the underfill is best optimized from properties of the substrate, chip, and solder.

Figure 4:
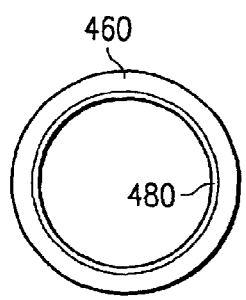
FIG. 4 is a cross section of the spacer showing a reflective interior surface.

A cross-sectional view of the spacer 460, in FIG. 4 shows a reflective coating 480, preferably on the inner surface of the hollow tubule which redirects stray light back into the optical path, thereby providing a highly efficient optical interconnection. Spacers transparent to a specific light beam of the device can be coated on the outer surface by a reflective film with similar results.

Figure 5:
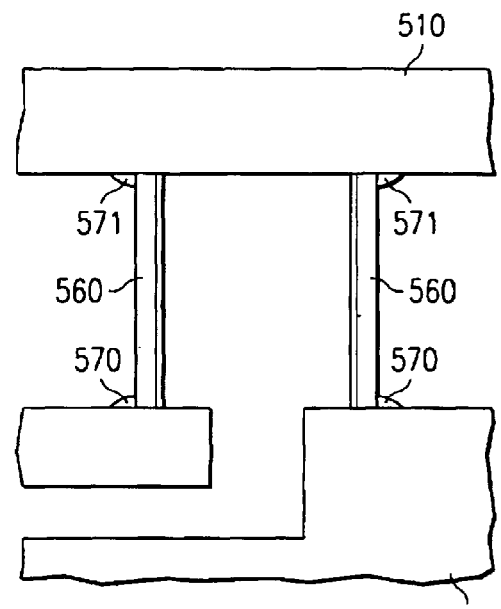
FIG. 5 shows in greater detail attachment of the spacer to chip and substrate.

In FIG. 5, a cross sectional view of the spacer 560 of predefined height is secured to both the substrate 500 and chip 510 interfaces by fine beads of low modulus polymer 570/571 respectively. The preferred low modulus adhesive allows some thermal expansion to take place within the assembly without putting excessive stress on the sensitive surfaces to which the spacer is adhered.

Figure 6:
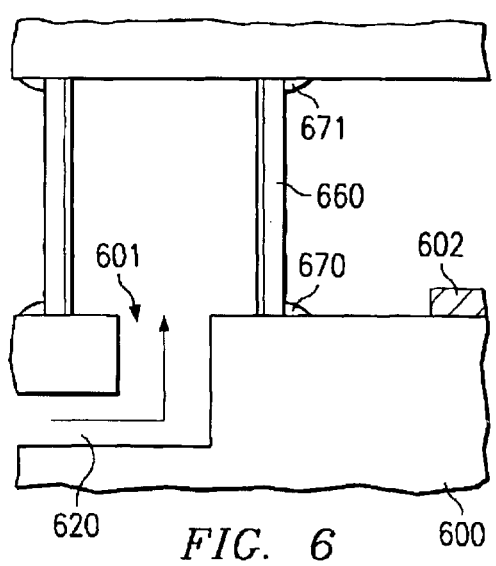
FIG. 6 demonstrates attachment of the spacer to the substrate.

In a preferred embodiment, a substrate 600 having wiring paths and solder bump pads 602 is fabricated with one or more spacers 660 attached by a low modulus adhesive 670 in the area adjacent to an aperture wherein the signal from the optical fiber 620 or waveguide emerges, as shown in FIG. 6. Subsequently, the opposite end of the spacer, having a bead of adhesive 671 on the outer surface is attached to the chip during flip chip solder reflow.

Figure 7:
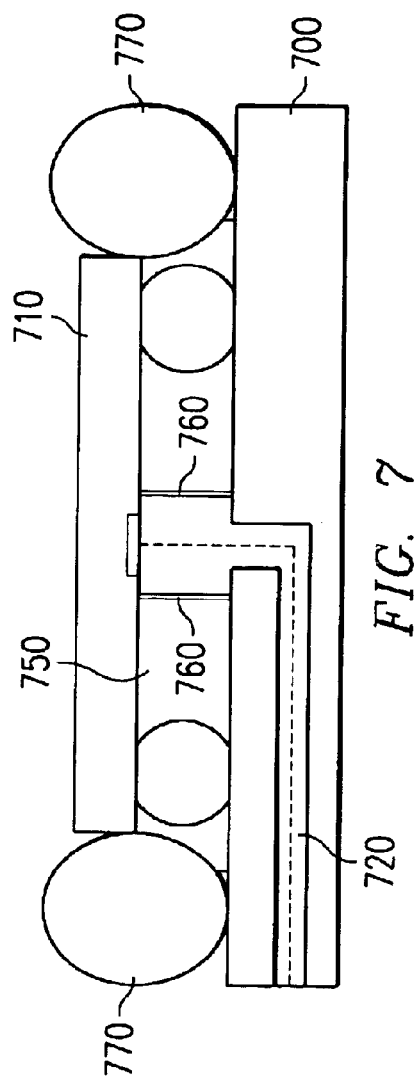
FIG. 7 is a single chip embodiment of the invention.

The current invention for assembly of hybrid optoelectronic devices is applicable to packaging of a single flip chip 710, as shown in FIG. 7, wherein the substrate 700 of the optoelectronic device is the package base, and the package is configured for subsequent attachment to a circuit board by solder balls 770. The optical signal to the chip is transmitted through a spacer 760 from an optical fiber 720 without interference from an underfill material.

Figure 8:
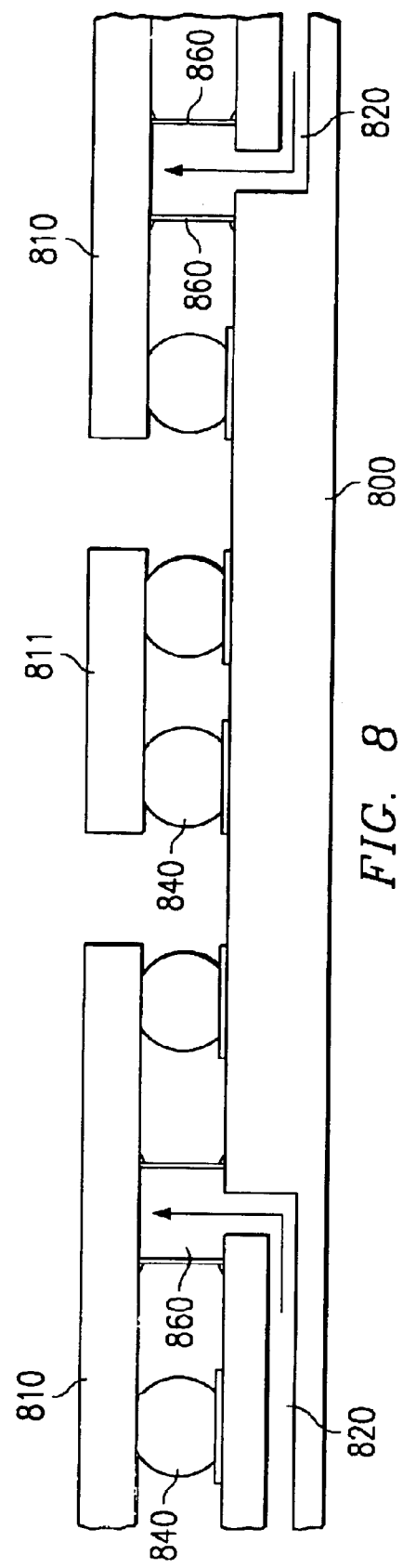
FIG. 8 is a multi-chip embodiment of the invention.

However, the preferred embodiment of the invention includes assembly a module having multiple solder bump 840 connected flip chip optoelectronic devices 810 and conventional chips 811 to a substrate 800 using one or more hollow spacers 860 between the active circuit and the optical fiber 820 to transmit light without interference or attenuation, as shown in FIG. 8.

The invention has been discussed most frequently with reference to an optical fiber as the transport and guide for optical signals, however, it is amenable to wave guide and other forms of light transmission.

The hybrid optoelectronic device of the invention anticipates inclusion of both silicon and gallium arsenide chips, and the substrate will comprise a ceramic, a polymeric composite, or a semiconductor material. The flip chip interconnections are preferably one of many solder compositions, but can also be formed by conductive polymers. The underfill is a polymeric material, typical of those used in semiconductor flip chip assembly. The spacer preferably comprises a hollow glass tube of predefined length, coated with a reflective film, and attached by a low modulus polymeric adhesive to the substrate and chip. Inside diameter of the spacer is preferably in the range of 75 micron to 150 microns, with the wall diameter about 25 to 50 microns. The glass is an ordinary glass such as that typically found in laboratory supply catalogue. Alternate materials for spacers are metals, alloys, or polymers.

One method for assembling an optoelectronic device of this invention includes providing a substrate having an optical fiber, wave guide, or other optical transmission device secured in the substrate, and aligned within an aperture on the first surface of the substrate.

A thin bead of a "b" staged thermosetting polymer or a thermoplastic polymer is disposed on the substrate surrounding the aperture. The adhesive will subsequently be used to adhere the first end of a hollow spacer to the substrate and allow signal transmission through the spacer.

A hollow spacer, having a bead of adhesive 671 disposed on the outer surface near the second end of the spacer is aligned by pick and place equipment to the adhesive on the substrate, and is adhered by heat activation, as shown in FIG. 6.

Alignment between the optoelectronic chip and the optical transmission device in the "x" and "y" directions is achieved by aligning flip chip solder bumps on the chip with mirroring pads on the substrate, and heating to reflow the solder. Self aligning properties of the solder to metallized pad assure "x" and "y" positioning to within half the pad dimensions.

Simultaneously, during solder reflow, the spacer is adhered to the chip by thermal activation of the adhesive on the second end of the spacer, thereby providing "z" axis alignment controlled by the predetermined height of the spacer. The fixed height of the spacer controls the distance between chip and substrate, and does not allow variation in stand-off space as a function of solder reflow conditions.

An underfill material is dispensed to fill the space between the chip and substrate, and lend support to the solder joints.

The resulting optoelectronic device is aligned in the "x", "y", and "z" axes, and the spacer serves as a dam to prevent any contamination from underfill or other sources from intruding into the light path while allowing use of conventional packaging technology. A method supporting high speed transmission of the optical signal between chip and substrate has been achieved and other advantageous results attained.

Various changes could be made in the above construction and methods without departing from the scope and spirit of the invention, but it is intended that all matter contained in the above descriptions and drawings shall be interpreted as illustrative and not in a limiting sense.

What is claimed is:

1. An assembly for coupling an optoelectronic circuit to a substrate including;
   a) one or more transport devices secured in said substrate through which optical signals can be carried, and in turn can be emitted through corresponding apertures on the first surface of said substrate,
   b) a plurality of wiring paths and contact pads defined on the first surface of said substrate,
   c) one or more optoelectronic chips connected to said substrate by flip chip contacts,
   d) one or more hollow cylindrical spacers coupling said apertures to active circuits on said chip surface, and
   e) an underfill material between the chips and substrate, separated from the optical signal path by said spacers.

2. An assembly as in claim 1 wherein said optical signal transport device is an optical fiber.

3. An assembly as in claim 1 wherein said optical signal carrying device is a wave guide.

4. An assembly as in claim 1 wherein said spacer is a stand-off member of predefined height.

5. An assembly as in claim 1 wherein said spacers are attached by a low modulus polymer.

6. An assembly as in claim 1 wherein said flip chip contacts comprise solder.

7. An assembly as in claim 1 wherein said spacer includes a reflective film coating the interior walls of the cylinder.

8. An assembly as in claim 1 wherein said underfill material is a polymer formulated with a filler having no special optical transmission properties.

9. An assembly as in claim 1 wherein said spacer is a glass tube.

10. An assembly in claim 1 wherein said spacer is a metal tube.

11. An assembly as in claim 1 wherein said substrate is not necessarily matched to said chip in coefficient of thermal expansion.

12. An assembly as in claim 1 wherein said chips include silicon and gallium arsenide.

13. An assembly as in claim 1 wherein said spacer defines the distance between said chip and substrate, thereby controlling "z" axis alignment.

14. An assembly as in claim 1 wherein attenuation of optical signals between chip and substrate is minimal as a result of direct air transmission through said hollow spacer.

15. An assembly as in claim 1 wherein said substrate is the base of a single chip optoelectronic device package.

16. An assembly as in claim 1 wherein said substrate is the base of a multi-chip module.

17. A method for the assembly of an optoelectronic device optically coupled to a substrate including the following steps:
   a) providing a substrate having interconnection wiring and pads for flip chip assembly on the first surface, and having an optical transmission device secured in the substrate which is aligned to an aperture on the first surface,
   b) disposing a head of low modulus adhesive to encircle said aperture,
   c) providing a hollow cylinder of predefined height having a bead of low modulus adhesive near the second end of said cylinder,
   d) adhering the first end of said cylinder to the substrate by the adhesive encircling an aperture,
   e) aligning and bonding a chip having flip chip solder contacts to the substrate, and concurrently adhering the spacer cylinder to the chip surface, and
   f) dispensing an underfill polymer to fill the space between chip and substrate, except in the optical path provided by said cylinder.

* * * * *